US009067738B1

(12) United States Patent  
Frye

(10) Patent No.: US 9,067,738 B1  
(45) Date of Patent: Jun. 30, 2015

(54) SAFETY RETURN IDLER GLOVE

(71) Applicant: Charles A. Frye, Washburn, TN (US)

(72) Inventor: Charles A. Frye, Washburn, TN (US)

(*) Notice: Subject to any disclaimer, the term of this patent is extended or adjusted under 35 U.S.C. 154(b) by 222 days.

(21) Appl. No.: 13/852,019

(22) Filed: Mar. 28, 2013

(51) Int. Cl.  
    *B65G 15/00*     (2006.01)  
    *B65G 39/12*     (2006.01)  
    *B65G 21/00*     (2006.01)

(52) U.S. Cl.  
    CPC ........................... *B65G 21/00* (2013.01)

(58) Field of Classification Search  
    None  
    See application file for complete search history.

(56) References Cited

U.S. PATENT DOCUMENTS

| 3,268,060 | A | 8/1966 | Long |
| 6,318,545 | B1 | 11/2001 | Ross, II |
| 6,672,450 | B2 | 1/2004 | Horne |
| 7,284,658 | B2 | 10/2007 | Wiggins et al. |
| 7,971,705 | B2 * | 7/2011 | Jabber et al. .................. 198/830 |
| 8,151,968 | B2 | 4/2012 | Bremhorst |
| 2006/0163041 | A1 | 7/2006 | Wiggins et al. |

* cited by examiner

*Primary Examiner* — Kavel Singh  
(74) *Attorney, Agent, or Firm* — Richard L. Miller

(57) ABSTRACT

A guard bracket including a first portion, a second portion, and a third portion. The first portion is for attaching to an existing attachment point hardware of an exposed return roller of a conveyor belt system to facilitate installation of the guard bracket on the conveyor belt system. The second portion extends from the first portion, and is for preventing accumulation of debris between the guard bracket and the exposed return roller of the conveyor belt system. The third portion extends from the second portion, and in combination with the second portion, are for capturing an end of the exposed return roller of the conveyor belt system when the end of the exposed return roller of the conveyor belt system becomes disengaged and free-falling, even when the exposed return roller of the conveyor belt system is still spinning.

44 Claims, 5 Drawing Sheets

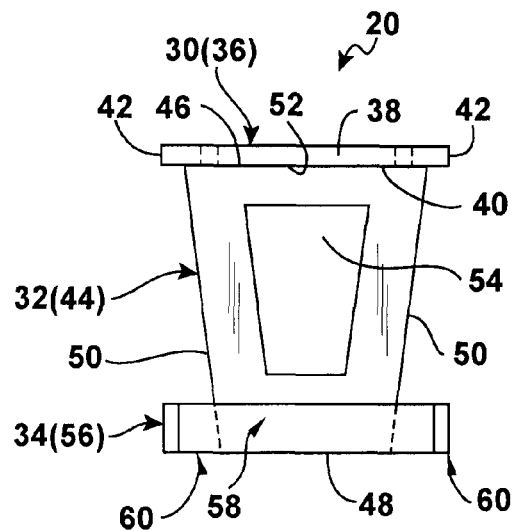
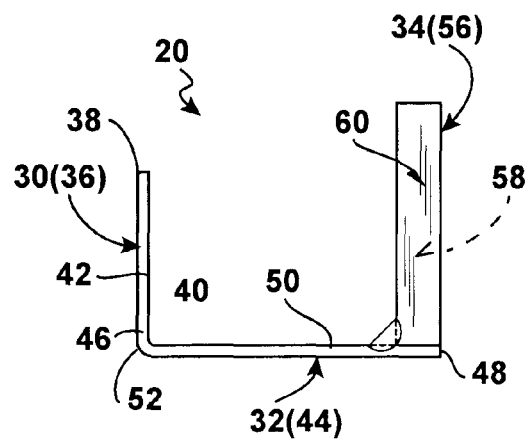
FIG. 6  FIG. 7
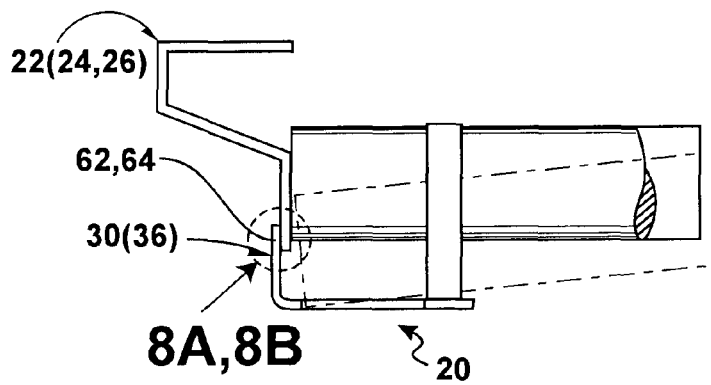
FIG. 8
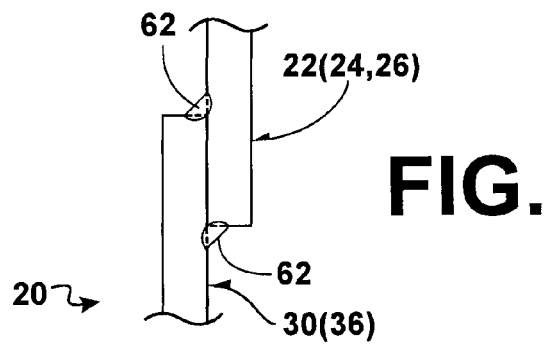
FIG. 8A

SAFETY RETURN IDLER GLOVE

1. BACKGROUND OF THE INVENTION

A. Field of the Invention

The embodiments of the present invention relate to a conveyor belt return roller safety support system, and more particularly, the embodiments of the present invention relate to a guard bracket for attaching to existing attachment point hardware of an exposed return roller of a conveyor belt system to facilitate installation of the guard bracket on the existing conveyor system, for preventing accumulation of debris between the guard bracket and the exposed return roller of the conveyor belt system, and for capturing an end of the exposed return roller of the conveyor belt system when the end of the exposed return roller of the conveyor belt system becomes disengaged and free-falling, even when the exposed return roller of the conveyor belt system is still spinning.

B. Description of the Prior Art

Numerous innovations for conveyor belt return roller safety support systems have been provided in the prior art, which will be described below in chronological order to show advancement in the art, and which are incorporated in their entirety herein by reference thereto. Even though these innovations may be suitable for the specific individual purposes to which they address, nevertheless, they differ from the present invention in that they do not teach a guard bracket for attaching to existing attachment point hardware of an exposed return roller of a conveyor belt system to facilitate installation of the guard bracket on the existing conveyor system, for preventing accumulation of debris between the guard bracket and the exposed return roller of the conveyor belt system, and for capturing an end of the exposed return roller of the conveyor belt system when the end of the exposed return roller of the conveyor belt system becomes disengaged and free-falling, even when the exposed return roller of the conveyor belt system is still spinning.

(1) U.S. Pat. No. 3,268,060 to Long

U.S. Pat. No. 3,268,060 issued to Long on Aug. 23, 1966 in U.S. class 198 and subclass 812 teaches a strand supported conveyor system including the combination of a head section and a tail section. The tail section is movable toward and away from the head section in extension and retraction of the conveyor. A mobile conveyor-like apparatus anchors the strands of the conveyor system adjacent to and spaced-apart from the tail section. The apparatus includes a frame. Apparatus is mounted on the frame for enabling and facilitating bodily movement of the frame in longitudinal alignment with the strands of the strand supported conveyor. The last mentioned apparatus includes spring apparatus attached to the frame, and wheel apparatus is attached to the spring apparatus. The spring apparatus and the wheel apparatus are juxtaposed with respect to the frame to permit vertical movement of the frame on the spring apparatus and with respect to the wheel apparatus. Ground engaging apparatus is mounted on the frame for locking the frame at a given ground location. The ground engaging apparatus include apparatus for causing abutment of the frame apparatus with the surface upon which the wheel apparatus rides whereby actuation of the ground engaging apparatus renders the frame immobile. Clamp apparatus is mounted on the frame. The clamping apparatus includes apparatus operable to lock the strands of the strand supported conveyor onto the frame.

(2) U.S. Pat. No. 6,318,545 to Ross, II

U.S. Pat. No. 6,318,545 issued to Ross, II on Nov. 20, 2001 in U.S. class 198 and subclass 860.3 teaches a guard adapted for enclosing an exposed return roller in a conveyor belt system. The guard attachment brackets are adapted to utilize the existing attachment point hardware of the exposed return roller to facilitate guard installation on an existing conveyor system. The attachment brackets provide adjustment of the guard relative the return roller. The guard permits visual inspection to detect accumulation of debris between the guard and return roller. The guard may also be adapted with wiper extensions for cleaning debris from the conveyor belt surface.

(3) U.S. Pat. No. 6,672,450 to Horne

U.S. Pat. No. 6,672,450 issued to Horne on Jan. 6, 2004 in U.S. class 198 and subclass 836.3 teaches an idler system for conveyors. The system provides an idler that is released or propelled downwardly away from the conveyor belt when a pre-determined condition is present, such as the tripping of an idler guard or the presence of a pre-determined amount of pressure on the idler. The idler itself may be releasably attached to a conveyor framework or it may be provided with an idler bracket that is partially or wholly released with the idler.

(4) United States Patent Application Publication Number 2006/0163041 to Wiggins et al.

United States Patent Application Publication Number 2006/0163041 published to Wiggins et al. on Jul. 27, 2006 in U.S. class 198 and subclass 842 teaches a conveyor system having a conveying belt trained around a plurality of guide rollers for movement in an endless travel path to convey articles and materials in a travel line. A first roller is mounted in an operative position on a support to bear against the conveying belt. A roller safety support system has a wall assembly that confines downward movement of the first roller in the event that the first roller becomes disengaged from the operative position. The roller safety support system further includes a frame assembly. The wall assembly is mounted to the frame assembly so that an upwardly facing surface on the wall assembly bears supportingly against the first roller in the event that the first roller becomes disengaged from the operative position. The upwardly facing surface bounds a receptacle in which the first roller is confined by the wall assembly in the event that the first roller disengages from the operative position. The receptacle has a variable configuration.

(5) U.S. Pat. No. 7,284,658 to Wiggins et al.

U.S. Pat. No. 7,284,658 issued to Wiggins et al. on Oct. 23, 2007 in U.S. class 198 and subclass 860.3 teaches a conveyor system having a conveying belt trained around a plurality of guide rollers for movement in an endless travel path to convey articles and materials in a travel line. A first roller is mounted in an operative position on a support to bear against the conveying belt. A roller safety support system has a wall assembly that confines downward movement of the first roller in the event that the first roller becomes disengaged from the operative position. The roller safety support system further includes a frame assembly. The wall assembly is mounted to the frame assembly so that an upwardly facing surface on the wall assembly bears supportingly against the first roller in the event that the first roller becomes disengaged from the operative position. The upwardly facing surface bounds a receptacle in which the first roller is confined by the wall assembly in the event that the first roller disengages from the operative position. The receptacle has a variable configuration.

(6) U.S. Pat. No. 8,151,968 to Bremhorst

U.S. Pat. No. 8,151,968 issued to Bremhorst on Apr. 10, 2012 in U.S. class 198 and subclass 313 teaches an extendable support apparatus for supporting an endless conveyor belt having an extendable frame and a rest for supporting the conveyor belt relative to the frame. The extendable support apparatus is able to be extended and retracted by, respectively, extending and retracting the extendable frame while the conveyor belt circulates relative to the extendable support apparatus and while the conveyor belt is supported by the rest.

It is apparent that numerous innovations for conveyor belt return roller safety support systems have been provided in the prior art, which are adapted to be used. Furthermore, even though these innovations may be suitable for the specific individual purposes to which they address, nevertheless, they would not be suitable for the purposes of the embodiments of the present invention as heretofore described, namely, a guard bracket for attaching to existing attachment point hardware of an exposed return roller of a conveyor belt system to facilitate installation of the guard bracket on the existing conveyor system, for preventing accumulation of debris between the guard bracket and the exposed return roller of the conveyor belt system, and for capturing an end of the exposed return roller of the conveyor belt system when the end of the exposed return roller of the conveyor belt system becomes disengaged and free-falling, even when the exposed return roller of the conveyor belt system is still spinning.

2. SUMMARY OF THE INVENTION

Thus, an object of the embodiments of the present invention is to provide a guard bracket for attaching to existing attachment point hardware of an exposed return roller of a conveyor belt system to facilitate installation of the guard bracket on the existing conveyor system, for preventing accumulation of debris between the guard bracket and the exposed return roller of the conveyor belt system, and for capturing an end of the exposed return roller of the conveyor belt system when the end of the exposed return roller of the conveyor belt system becomes disengaged and free-falling, even when the exposed return roller of the conveyor belt system is still spinning, which avoids the disadvantages of the prior art.

Briefly stated, another object of the embodiments of the present invention is to provide a guard bracket for attaching to existing attachment point hardware of an exposed return roller of a conveyor belt system to facilitate installation of the guard bracket on the conveyor belt system, for preventing accumulation of debris between the guard bracket and the exposed return roller of the conveyor belt system, and for capturing an end of the exposed return roller of the conveyor belt system when the exposed return roller of the conveyor belt system becomes disengaged and free-falling, even when the exposed return roller of the conveyor belt system is still spinning. The guard bracket includes a first portion, a second portion, and a third portion. The first portion is for attaching to the existing attachment point hardware of the exposed return roller of the conveyor belt system to facilitate installation of the guard bracket on the conveyor belt system. The second portion extends from the first portion, and is for preventing the accumulation of the debris between the guard bracket and the exposed return roller of the conveyor belt system. The third portion extends from the second portion, and in combination with the second portion, are for capturing the end of the exposed return roller of the conveyor belt system when the end of the exposed return roller of the conveyor belt system becomes disengaged and free-falling, even when the exposed return roller of the conveyor belt system is still spinning.

The novel features considered characteristic of the embodiments of the present invention are set forth in the appended claims. The embodiments of the present invention themselves, however, both as to their construction and to their method of operation together with additional objects and advantages thereof will be best understood from the following description of the specific embodiments when read and understood in connection with the accompanying figures of the drawing.

3. BRIEF DESCRIPTION OF THE FIGURES OF THE DRAWING

The figures of the drawing are briefly described as follows:

FIG. 1 is a diagrammatic perspective view of a first embodiment of the guard bracket of the present invention attached to existing attachment point hardware of an exposed return roller of a conveyor belt system to facilitate installation of the guard bracket on the conveyor belt system, preventing accumulation of debris between the guard bracket and the exposed return roller of the conveyor belt system, and capturing an end of the exposed return roller of the conveyor belt system when the end of the exposed return roller of the conveyor belt system becomes disengaged and free-falling, even when the exposed return roller of the conveyor belt system is still spinning;

FIG. 6 is a diagrammatic top plan view taken generally in the direction of ARROW 6 in FIG. 4 after being folded;

FIG. 7 is a diagrammatic side elevational view taken generally in the direction of ARROW 7 in FIG. 4;

FIG. 8 is a reduced side elevational view of the area generally enclosed by the dotted curve identified by ARROW 8 in FIG. 3;

FIG. 8A is an enlarged diagrammatic side elevational view of the area generally enclosed by the dotted curve identified by ARROW 8A in FIG. 8;

4. LIST OF REFERENCE NUMERALS UTILIZED IN THE FIGURES OF THE DRAWING

A. Introduction to First Embodiment

Figure 1:
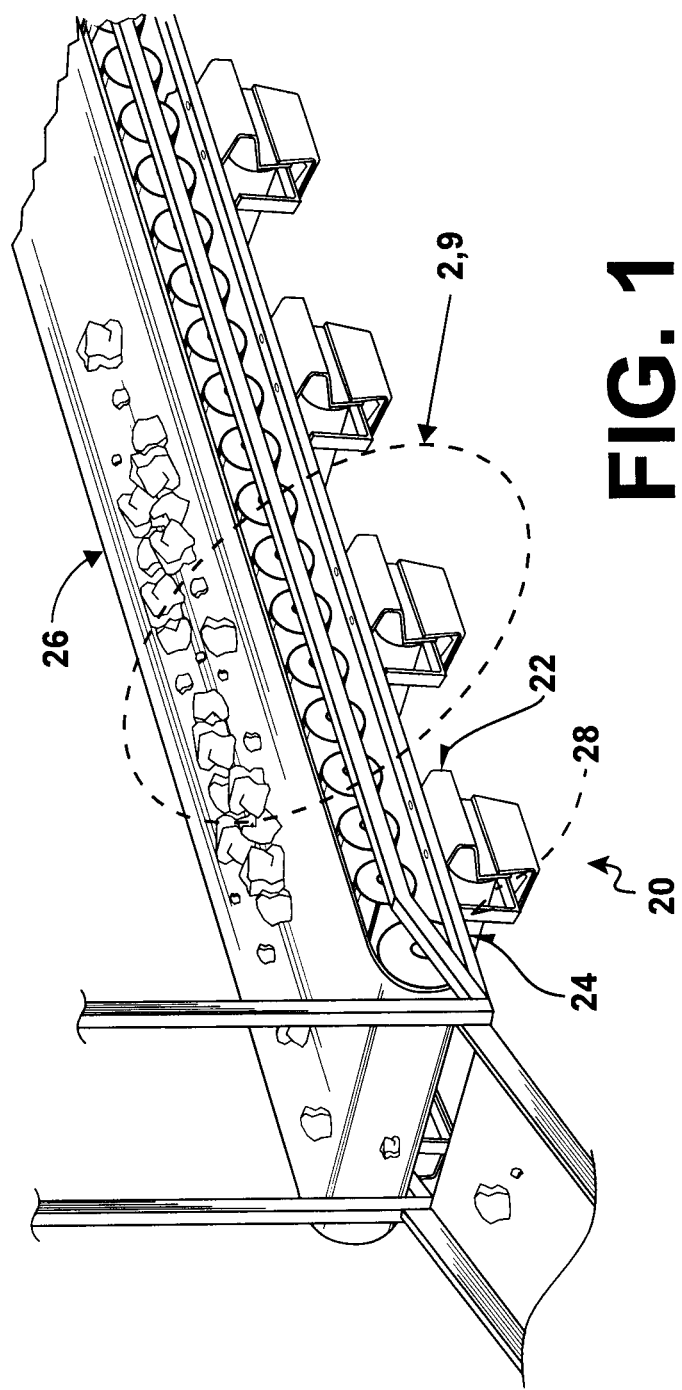

20 guard bracket of first embodiment of present invention for attaching to existing attachment point hardware 22 of exposed return roller 24 of conveyor belt system 26 to facilitate installation of guard bracket 20 on conveyor belt system 26, for preventing accumulation of debris between guard bracket 20 and exposed return roller 24 of conveyor belt system 26, and for capturing end 28 of exposed return roller 24 of conveyor belt system 26 when end 28 of exposed return roller 24 of conveyor belt system 26 becomes disengaged and free-falling, even when exposed return roller 24 of conveyor belt system 26 is still spinning 22 existing attachment point hardware of exposed return roller 24 of conveyor belt system 26
24 exposed return roller of conveyor belt system 26
26 conveyor belt system
28 end of exposed return roller 24 of conveyor belt system 26

B. Overall Configuration of Guard Bracket 20

30 first portion for attaching to existing attachment point hardware 22 of exposed return roller 24 of conveyor belt system 26 to facilitate installation of guard bracket 20 on conveyor belt system 26
32 second portion for preventing accumulation of debris between guard bracket 20 and exposed return roller 24 of conveyor belt system 26 and for capturing end 28 of exposed return roller 24 of conveyor belt system 26 when end 28 of exposed return roller 24 of conveyor belt system 26 becomes disengaged and free-falling, even when exposed return roller 24 of conveyor belt system 26 is still spinning
34 third portion for capturing end 28 of exposed return roller 24 of conveyor belt system 26 when end 28 of exposed return roller 24 of conveyor belt system 26 becomes disengaged and free-falling, even when exposed return roller 24 of conveyor belt system 26 is still spinning

C. Specific Configuration of First Portion 30

36 trapezoidal-shaped plate of first portion 30 for attaching to existing attachment point hardware 22 of exposed return roller 24 of conveyor belt system 26 to facilitate installation of guard bracket 20 on conveyor belt system 26
38 upper edge of trapezoidal-shaped plate 36 of first portion 30
40 lower edge of trapezoidal-shaped plate 36 of first portion 30
42 pair of side edges of trapezoidal-shaped plate 36 of first portion 30

D. Specific Configuration of Second Portion 32

44 trapezoidal-shaped plate of second portion 32
46 outer edge of trapezoidal-shaped plate 44 of second portion 32
48 inner edge of trapezoidal-shaped plate 44 of second portion 32
50 pair of side edges of trapezoidal-shaped plate 44 of second portion 32
52 bend line
54 coaxially disposed through aperture of trapezoidal-shaped plate 44 of second portion 32 for preventing accumulation of debris between guard bracket 20 and exposed return roller 24 of conveyor belt system 26 and for assisting in capturing end 28 of exposed return roller 24 of conveyor belt system 26 when end 28 of exposed return roller 24 of conveyor belt system 26 becomes disengaged and free-falling, even when exposed return roller 24 of conveyor belt system 26 is still spinning

E. Specific Configuration of Third Portion 34

56 U-shaped portion of third portion 34
58 horizontal part of U-shaped portion 56 of third portion 34
60 pair of vertical parts of U-shaped portion 56 of third portion 34 for capturing end 28 of exposed return roller 24 of conveyor belt system 26 when end 28 of exposed return roller 24 of conveyor belt system 26 becomes disengaged and free-falling, even when exposed return roller 24 of conveyor belt system 26 is still spinning

F. Attachment of guard bracket 20 to existing attachment point hardware 22 of exposed return roller 24 of conveyor belt system 26

62 welds
64 combination nuts and bolts

G. Configuration of Second Embodiment of Guard Bracket 120

120 guard bracket
130 first portion
132 second portion
134 third portion
166 U-shaped, rod-like first portion of first portion 130
168 trapezoidal-shaped, rod-like second portion of second portion 132
170 U-shaped, rod-like third portion of third portion 134

5. DETAILED DESCRIPTION OF THE PREFERRED EMBODIMENTS

A. Introduction to the First Embodiment

Figure 2:
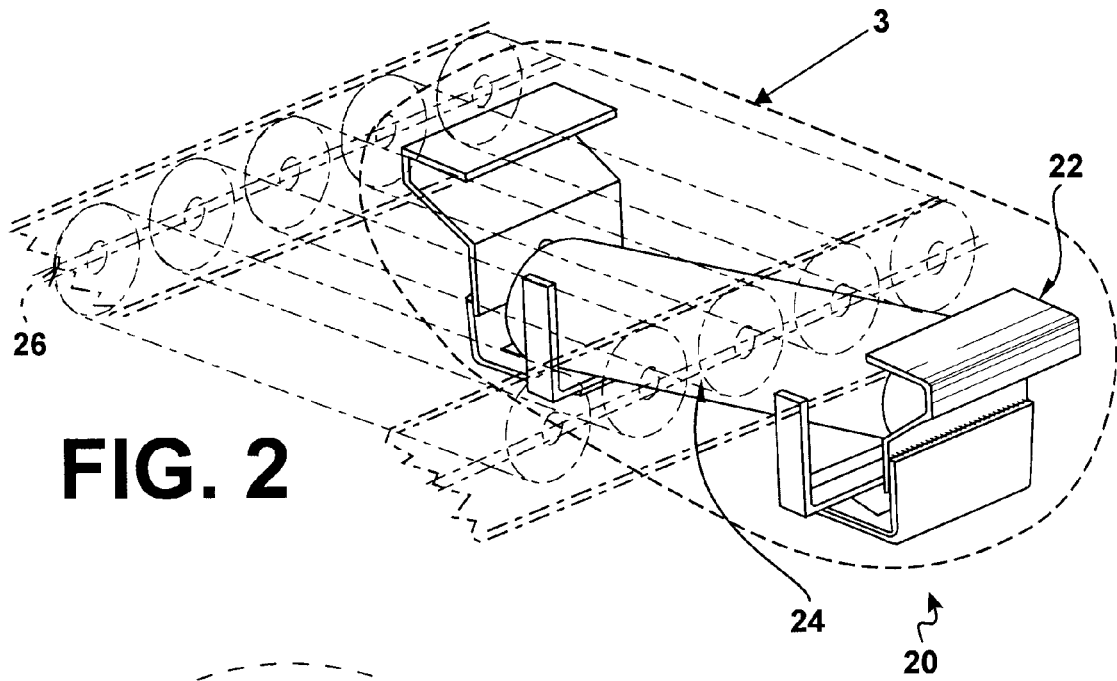
FIG. 2 is an enlarged diagrammatic perspective view in partial phantom of the area generally enclosed by the dotted curve identified by ARROW 2 in FIG. 1.
Figure 3:
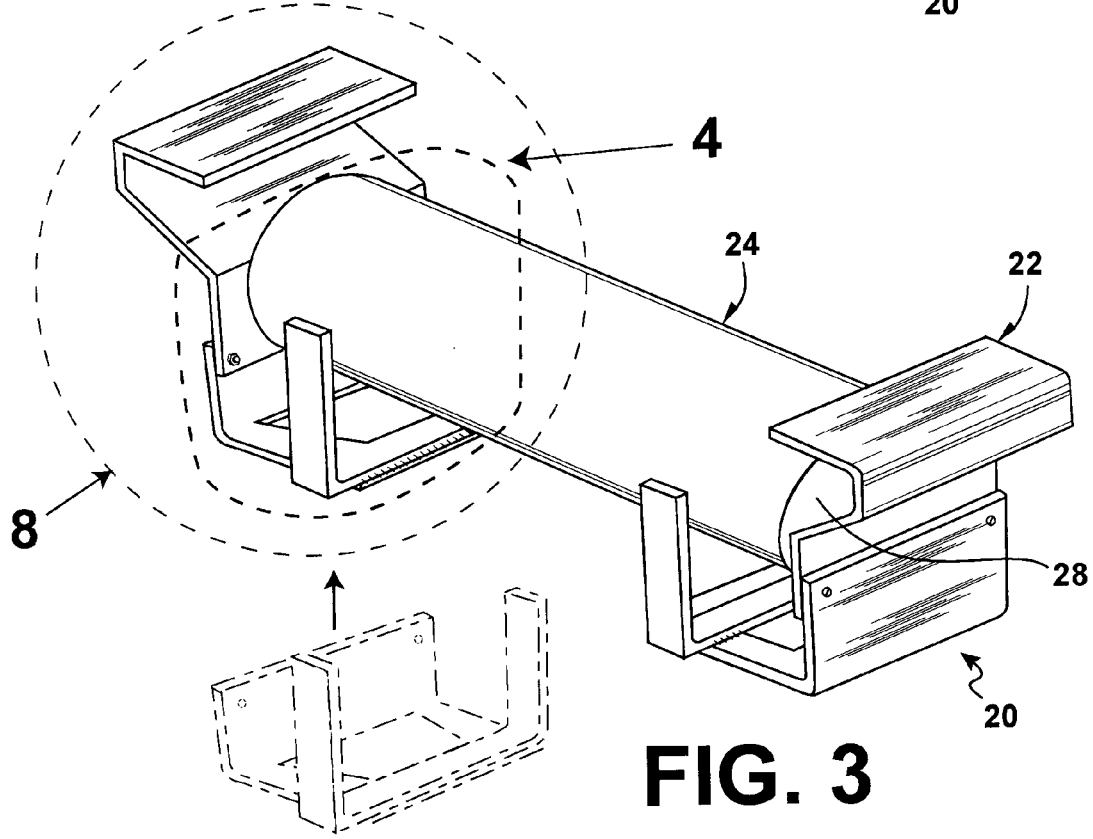
FIG. 3 is an enlarged diagrammatic perspective view of the area generally enclosed by the dotted curve identified by ARROW 3 in FIG. 2.

Referring now to the figures, in which like numerals indicate like parts, and particularly to FIG. 1-3, which are, respectively, a diagrammatic perspective view of a first embodiment of the guard bracket of the present invention attached to existing attachment point hardware of an exposed return roller of a conveyor belt system to facilitate installation of the guard bracket on the conveyor belt system, preventing accumulation of debris between the guard bracket and the exposed return roller of the conveyor belt system, and capturing an end of the exposed return roller of the conveyor belt system when the end of the exposed return roller of the conveyor belt system becomes disengaged and free-falling, even when the exposed return roller of the conveyor belt system is still spinning, an enlarged diagrammatic perspective view in partial phantom of the area generally enclosed by the dotted curve identified by ARROW 2 in FIG. 1, and an enlarged diagrammatic perspective view of the area generally enclosed by the dotted curve identified by ARROW 3 in FIG. 2, the guard bracket of the first embodiment of the present invention is shown generally at 20 for attaching to existing attachment point hardware 22 of an exposed return roller 24 of a conveyor belt system 26 to facilitate installation of the guard bracket 20 on the conveyor belt system 26, for preventing accumulation of debris between the guard bracket 20 and the exposed return roller 24 of the conveyor belt system 26, and for capturing an end 28 of the exposed return roller 24 of the conveyor belt system 26 when the end 28 of the exposed return roller 24 of the conveyor belt system 26 becomes disengaged and free-falling, even when the exposed return roller 24 of the conveyor belt system 26 is still spinning.

B. Overall Configuration of the Guard Bracket 20

Figure 4:
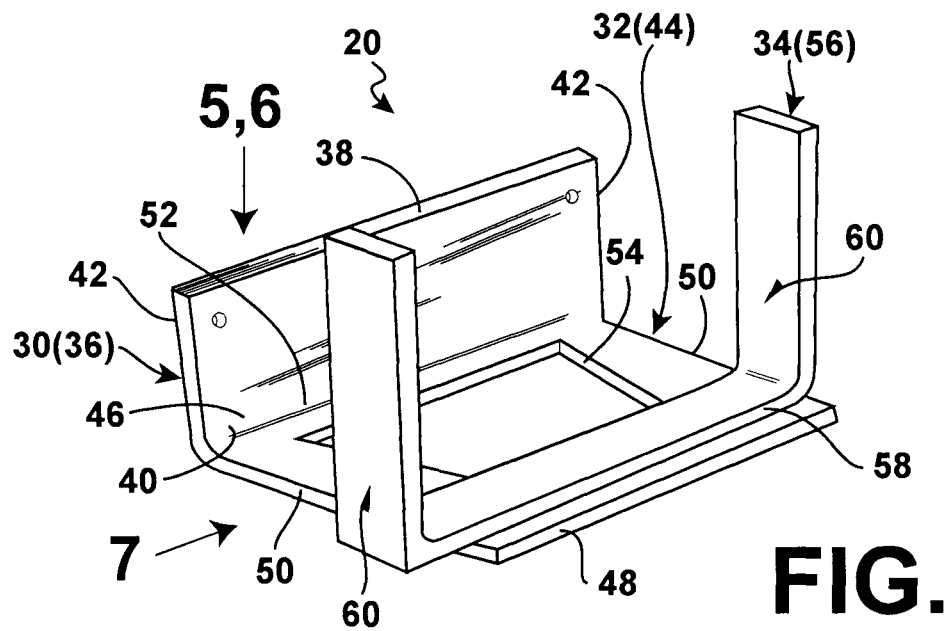
FIG. 4 is an enlarged diagrammatic perspective view of the area generally enclosed by the dotted curve identified by ARROW 4 in FIG. 3 of the first embodiment of the guard bracket of the present invention.
Figure 5:
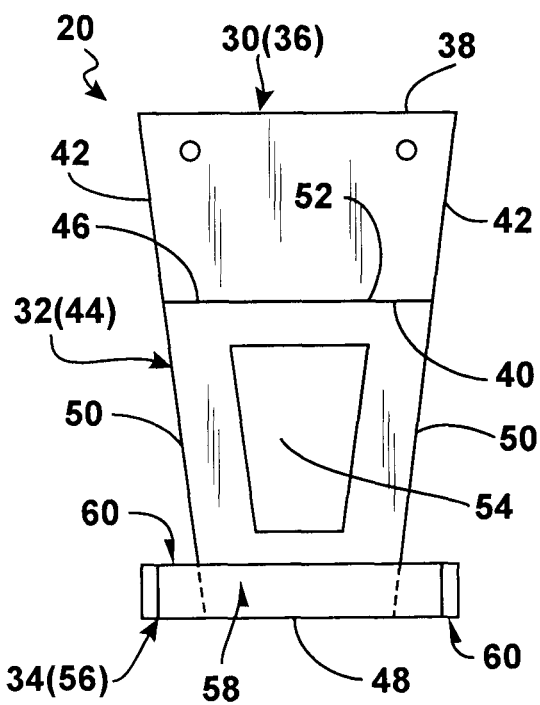
FIG. 5 is a diagrammatic top plan view taken generally in the direction of ARROW 5 in FIG. 4 prior to being folded.

The overall configuration of the guard bracket 20 can best be seen in FIGS. 4-7, which are, respectively, an enlarged diagrammatic perspective view of the area generally enclosed by the dotted curve identified by ARROW 4 in FIG. 3 of the first embodiment of the guard bracket of the present invention, a diagrammatic top plan view taken generally in the direction of ARROW 5 in FIG. 4 prior to being folded, a diagrammatic top plan view taken generally in the direction of ARROW 6 in FIG. 4 after being folded, and a diagrammatic side elevational view taken generally in the direction of ARROW 7 in FIG. 4, and as such, will be discussed with reference thereto.

The guard bracket 20 comprises a first portion 30, a second portion 32, and a third portion 34. The first portion 30 is for attaching to the existing attachment point hardware 22 of the exposed return roller 24 of the conveyor belt system 26 to facilitate installation of the guard bracket 20 on the conveyor belt system 26. The second portion 32 extends from the first portion 30, and is for preventing accumulation of debris between the guard bracket 20 and the exposed return roller 24 of the conveyor belt system 26. The third portion 34 extends from the second portion 32, and in combination with the second portion 32, are for capturing the end 28 of the exposed return roller 24 of the conveyor belt system 26 when the end 28 of the exposed return roller 24 of the conveyor belt system 26 becomes disengaged and free-falling, even when the exposed return roller 24 of the conveyor belt system 26 is still spinning.

C. Specific Configuration of the First Portion 30

The first portion 30 is a trapezoidal-shaped plate 36. The trapezoidal-shaped plate 36 of the first portion 30 is for attaching to the existing attachment point hardware 22 of the exposed return roller 24 of the conveyor belt system 26 to facilitate installation of the guard bracket 20 on the conveyor belt system 26.

The trapezoidal-shaped plate 36 of the first portion 30 is vertically oriented.

The trapezoidal-shaped plate 36 of the first portion 30 has an upper edge 38, a lower edge 40, and a pair of side edges 42.

The upper edge 38 of the trapezoidal-shaped plate 36 of the first portion 30 is horizontally oriented and straight.

The lower edge 40 of the trapezoidal-shaped plate 36 of the first portion 30 is horizontally oriented and straight.

The upper edge 38 of the trapezoidal-shaped plate 36 of the first portion 30 is parallel to the lower edge 40 of the trapezoidal-shaped plate 36 of the first portion 30.

The pair of side edges 42 of the trapezoidal-shaped plate 36 of the first portion 30 are vertically oriented, straight, and converge from the upper edge 38 of the trapezoidal-shaped plate 36 of the first portion 30 to the lower edge 40 of the trapezoidal-shaped plate 36 of the first portion 30.

D. Specific Configuration of the Second Portion 32

The second portion 32 is a trapezoidal-shaped plate 44.

The trapezoidal-shaped plate 44 of the second portion 32 is horizontally oriented.

The trapezoidal-shaped plate 44 of the second portion 32 has an outer edge 46, an inner edge 48, and a pair of side edges 50.

The outer edge 46 of the trapezoidal-shaped plate 44 of the second portion 32 is horizontally oriented and straight.

The inner edge 48 of the trapezoidal-shaped plate 44 of the second portion 32 is horizontally oriented and straight.

The outer edge 46 of the trapezoidal-shaped plate 44 of the second portion 32 is parallel to the inner edge 48 of the trapezoidal-shaped plate 44 of the second portion 32.

The pair of side edges 50 of the trapezoidal-shaped plate 44 of the second portion 32 are horizontally oriented, straight, and converge from the outer edge 46 of the trapezoidal-shaped plate 44 of the second portion 32 to the inner edge 48 of the trapezoidal-shaped plate 44 of the second portion 32.

The trapezoidal-shaped plate 44 of the second portion 32 extends perpendicularly from the trapezoidal-shaped plate 36 of the first portion 30, with the lower edge 40 of the trapezoidal-shaped plate 36 of the first portion 30 being coincident with the outer edge 46 of the trapezoidal-shaped plate 44 of the second portion 32 so as to form a bend line 52 so as to allow the trapezoidal-shaped plate 44 of the second portion 32 and the trapezoidal-shaped plate 36 of the first portion 30 to be bent from a single piece of material.

The trapezoidal-shaped plate 44 of the second portion 32 has a coaxially disposed through aperture 54. The coaxially disposed through aperture 54 of the trapezoidal-shaped plate 44 of the second portion 32 is for preventing the accumulation of the debris between the guard bracket 20 and the exposed return miler 24 of the conveyor belt system 26, and is for assisting in capturing the end 28 of the exposed return roller 24 of the conveyor belt system 26 when the end 28 of the exposed return roller 24 of the conveyor belt system 26 becomes disengaged and free-falling, even when the exposed return roller 24 of the conveyor belt system 26 is still spinning.

The coaxially disposed through aperture 54 of the trapezoidal-shaped plate 44 of the second portion 32 is trapezoidal-shaped to mimic that of, and be parallel to, respectively, the outer edge 46 of the trapezoidal-shaped plate 44 of the second portion 32, the inner edge 48 of the trapezoidal-shaped plate 44 of the second portion 32, and the pair of side edges 50 of the trapezoidal-shaped plate 44 of the second portion 32.

E. Specific Configuration of the Third Portion 34

The third portion 34 is a U-shaped portion 56.

The U-shaped portion 56 of the third portion 34 has a horizontal part 58, and a pair of vertical parts 60.

The horizontal part 58 of the U-shaped portion 56 of the third portion 34 is straight.

The pair of vertical parts 60 of the U-shaped portion 56 of the third portion 34 are straight, parallel to each other, and of equal length.

The horizontal part 58 of the U-shaped portion 56 of the third portion 34 is perpendicular to the pair of vertical parts 60 of the U-shaped portion 56 of the third portion 34.

The horizontal part 58 of the U-shaped portion 56 of the third portion 34 extends equidistantly across the inner edge 48 of the trapezoidal-shaped plate 44 of the second portion 32, with the pair of vertical parts 60 of the U-shaped portion 56 of the third portion 34 extending upwardly therefrom for capturing the end 28 of the exposed return roller 24 of the conveyor belt system 26 when the end 28 of the exposed return roller 24 of the conveyor belt system 26 becomes disengaged and free-falling, even when the exposed return roller 24 of the conveyor belt system 26 is still spinning.

F. Attachment of the Guard Bracket 20 to the
Existing Attachment Point Hardware 22 of the
Exposed Return Roller 24 of the Conveyor Belt
System 26

Figure 8B:
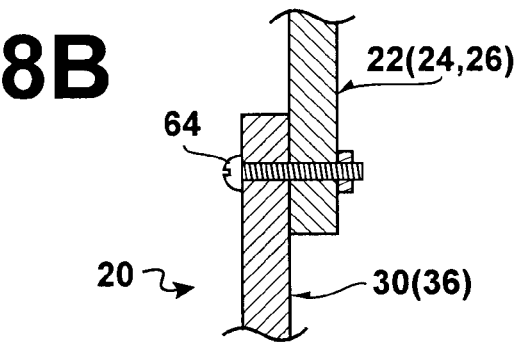
FIG. 8B is an enlarged diagrammatic side elevational view of the area generally enclosed by the dotted curve identified by ARROW 8B in FIG. 8.

The attachment of the guard bracket 20 to the existing attachment point hardware 22 of the exposed return roller 24 of the conveyor belt system 26 can best be seen in FIGS. 8, 8A, and 8B, which are, respectively, a reduced side elevational view of the area generally enclosed by the dotted curve identified by ARROW 8 in FIG. 3, an enlarged diagrammatic side elevational view of the area generally enclosed by the dotted curve identified by ARROW 8A in FIG. 8, and an enlarged diagrammatic side elevational view of the area generally enclosed by the dotted curve identified by ARROW 8B in FIG. 8, and as such, will be discussed with reference thereto.

As shown in FIGS. 8 and 8A, the guard bracket 20 is attached to the existing attachment point hardware 22 of the exposed return roller 24 of the conveyor belt system 26 by welds 62.

The welds 62 attach the trapezoidal-shaped plate 36 of the first portion 30 to the existing attachment point hardware 22 of the exposed return roller 24 of the conveyor belt system 26.

As shown in FIGS. 8 and 8B, the guard bracket 20 is attached to the existing attachment point hardware 22 of the exposed return roller 24 of the conveyor belt system 26 by combination nuts and bolts 64.

The combination nuts and bolts 64 attach the trapezoidal-shaped plate 36 of the first portion 30 to the existing attachment point hardware 22 of the exposed return roller 24 of the conveyor belt system 26.

G. Configuration of a Second Embodiment of the
Guard Bracket 120

Figure 9:
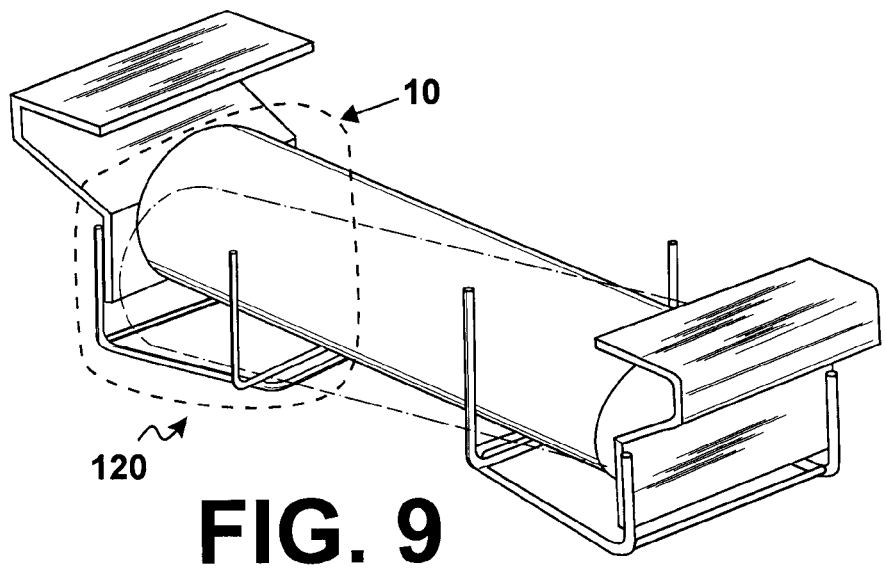
FIG. 9 is an enlarged diagrammatic perspective view of the area generally enclosed by the dotted curve identified by ARROW 9 in FIG. 1 of a second embodiment of the guard bracket of the present invention.
Figure 10:
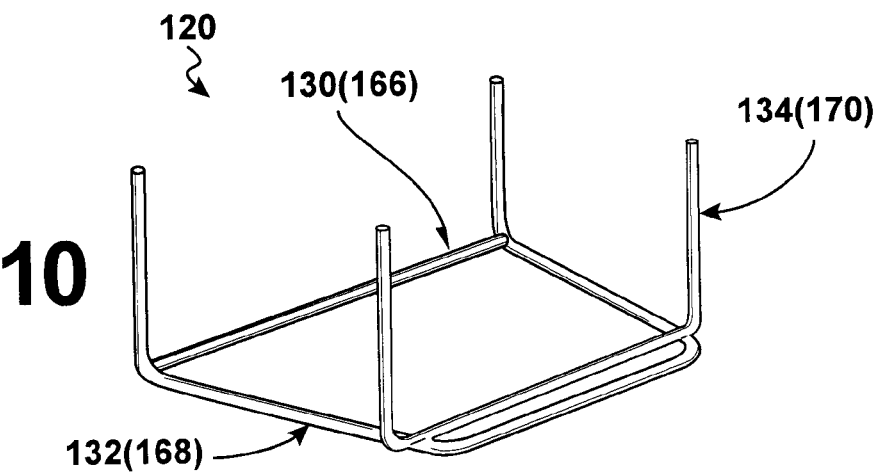
FIG. 10 is an enlarged diagrammatic perspective view of the area generally enclosed by the dotted curve identified by ARROW 10 in FIG. 9.

The configuration of a second embodiment of the guard bracket 120 can best be seen in FIGS. 9 and 10, which are, respectively, an enlarged diagrammatic perspective view of the area generally enclosed by the dotted curve identified by ARROW 9 in FIG. 1 of a second embodiment of the guard bracket of the present invention, and an enlarged diagrammatic perspective view of the area generally enclosed by the dotted curve identified by ARROW 10 in FIG. 9, and as such, will be discussed with reference thereto.

The first portion 130 is a U-shaped, rod-like first portion 166.

The second portion 132 is a trapezoidal-shaped, rod-like second portion 168.

The third portion 134 is a U-shaped, rod-like third portion 170.

H. Impressions

It will be understood that each of the elements described above or two or more together may also find a useful application in other types of constructions differing from the types described above.

While the embodiments of the present invention have been illustrated and described as embodied in a guard bracket for attaching to existing attachment point hardware of an exposed return roller of a conveyor belt system to facilitate installation of the guard bracket on the conveyor belt system, for preventing accumulation of debris between the guard bracket and the exposed return roller of the conveyor belt system, and for capturing an end of the exposed return roller of the conveyor belt system when the end of the exposed return roller of the conveyor belt system becomes disengaged and free-falling, even when the exposed return roller of the conveyor belt system is still spinning, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A guard bracket for attaching to existing attachment point hardware of an exposed return roller of a conveyor belt system to facilitate installation of said guard bracket on the conveyor belt system, for preventing accumulation of debris between said guard bracket and the exposed return roller of the conveyor belt system, and for capturing an end of the exposed return roller of the conveyor belt system when the end of the exposed return roller of the conveyor belt system becomes disengaged and free-falling, even when the exposed return roller of said conveyor belt system is still spinning, said guard bracket comprising:
   a) a first portion;
   b) a second portion; and
   c) a third portion;
   wherein said first portion is for attaching to the existing attachment point hardware of the exposed return roller of the conveyor belt system to facilitate the installation of said guard bracket on the conveyor belt system;
   wherein said second portion extends from said first portion;
   wherein said second portion is for preventing the accumulation of the debris between said guard bracket and the exposed return roller of the conveyor belt system;
   wherein said third portion extends from said second portion;
   wherein said third portion, in combination with said second portion, are for capturing the end of the exposed return roller of the conveyor belt system when the end of the exposed return roller of the conveyor belt system becomes disengaged and free-falling, even when the exposed return roller of the conveyor belt system is still spinning;
   wherein said first portion is a trapezoidal-shaped plate; and
   wherein said trapezoidal-shaped plate of said first portion is for attaching to the existing attachment point hardware of the exposed return roller of the conveyor belt system to facilitate the installation of said guard bracket on the conveyor belt system.

2. The guard bracket of claim 1, wherein said trapezoidal-shaped plate of said first portion is vertically oriented.

3. The guard bracket of claim 1, wherein said trapezoidal-shaped plate of said first portion has:
   a) an upper edge;
   b) a lower edge; and
   c) a pair of side edges.

4. The guard bracket of claim 3, wherein said upper edge of said trapezoidal-shaped plate of said first portion is horizontally oriented.

5. The guard bracket of claim 3, wherein said upper edge of said trapezoidal-shaped plate of said first portion is straight.

6. The guard bracket of claim 3, wherein said lower edge of said trapezoidal-shaped plate of said first portion is horizontally oriented.

7. The guard bracket of claim 3, wherein said lower edge of said trapezoidal-shaped plate of said first portion is straight.

8. The guard bracket of claim 3, wherein said upper edge of said trapezoidal-shaped plate of said first portion is parallel to said lower edge of said trapezoidal-shaped plate of said first portion.

9. The guard bracket of claim 3, wherein said pair of side edges of said trapezoidal-shaped plate of said first portion are vertically oriented.

10. The guard bracket of claim 3, wherein said pair of side edges of said trapezoidal-shaped plate of said first portion are straight.

11. The guard bracket of claim 3, wherein said pair of side edges of said trapezoidal-shaped plate of said first portion converge from said upper edge of said trapezoidal-shaped plate of said first portion to said lower edge of said trapezoidal-shaped plate of said first portion.

12. The guard bracket of claim 2, wherein said second portion is a trapezoidal-shaped plate.

13. The guard bracket of claim 12, wherein said trapezoidal-shaped plate of said second portion is horizontally oriented.

14. The guard bracket of claim 12, wherein said trapezoidal-shaped plate of said second portion has:
 a) an outer edge;
 b) an inner edge; and
 c) a pair of side edges.

15. The guard bracket of claim 14, wherein said outer edge of said trapezoidal-shaped plate of said second portion is horizontally oriented.

16. The guard bracket of claim 14, wherein said outer edge of said trapezoidal-shaped plate of said second portion is straight.

17. The guard bracket of claim 14, wherein said inner edge of said trapezoidal-shaped plate of said second portion is horizontally oriented.

18. The guard bracket of claim 14, wherein said inner edge of said trapezoidal-shaped plate of said second portion is straight.

19. The guard bracket of claim 14, wherein said outer edge of said trapezoidal-shaped plate of said second portion is parallel to said inner edge of said trapezoidal-shaped plate of said second portion.

20. The guard bracket of claim 14, wherein said pair of side edges of said trapezoidal-shaped plate of said second portion are horizontally oriented.

21. The guard bracket of claim 14, wherein said pair of side edges of said trapezoidal-shaped plate of said second portion are straight.

22. The guard bracket of claim 14, wherein said pair of side edges of said trapezoidal-shaped plate of said second portion converge from said outer edge of said trapezoidal-shaped plate of said second portion to said inner edge of said trapezoidal-shaped plate of said second portion.

23. The guard bracket of claim 12, wherein said trapezoidal-shaped plate of said second portion extends perpendicularly from said trapezoidal-shaped plate of said first portion.

24. The guard bracket of claim 14, wherein said lower edge of said trapezoidal-shaped plate of said first portion is coincident with said outer edge of said trapezoidal-shaped plate of said second portion.

25. The guard bracket of claim 14, wherein said lower edge of said trapezoidal-shaped plate of said first portion is coincident with said outer edge of said trapezoidal-shaped plate of said second portion so as to form a bend line so as to allow said trapezoidal-shaped plate of said second portion and said trapezoidal-shaped plate of said first portion to be bent from a single piece of material.

26. The guard bracket of claim 14, wherein said trapezoidal-shaped plate of said second portion has a coaxially disposed through aperture;
 wherein said coaxially disposed through aperture of said trapezoidal-shaped plate of said second portion is for preventing accumulation of the debris between said guard bracket and the exposed return roller of the conveyor belt system; and
 wherein said coaxially disposed through aperture of said trapezoidal-shaped plate of said second portion is for assisting in capturing the end of the exposed return roller of the conveyor belt system when the end of the exposed return roller of the conveyor belt system becomes disengaged and free-falling, even when the exposed return roller of the conveyor belt system is still spinning.

27. The guard bracket of claim 26, wherein said coaxially disposed through aperture of said trapezoidal-shaped plate of said second portion is trapezoidal-shaped to mimic that of, and be parallel to, respectively, said outer edge of said trapezoidal-shaped plate of said second portion, said inner edge of said trapezoidal-shaped plate of said second portion, and said pair of side edges of said trapezoidal-shaped plate of said second portion.

28. The guard bracket of claim 14, wherein said third portion is a U-shaped portion.

29. The guard bracket of claim 28, wherein said U-shaped portion of said third portion has:
 a) a horizontal part; and
 b) a pair of vertical parts.

30. The guard bracket of claim 29, wherein said horizontal part of said U-shaped portion of said third portion is straight.

31. The guard bracket of claim 29, wherein said pair of vertical parts of said U-shaped portion of said third portion are straight.

32. The guard bracket of claim 29, wherein said pair of vertical parts of said U-shaped portion of said third portion are parallel to each other.

33. The guard bracket of claim 29, wherein said pair of vertical parts of said U-shaped portion of said third portion are of equal length.

34. The guard bracket of claim 29, wherein said horizontal part of said U-shaped portion of said third portion is perpendicular to said pair of vertical parts of said U-shaped portion of said third portion.

35. The guard bracket of claim 29, wherein said horizontal part of said U-shaped portion of said third portion extends equidistantly across said inner edge of said trapezoidal-shaped plate of said second portion, with said pair of vertical parts of said U-shaped portion of said third portion extending upwardly therefrom for capturing the end of the exposed return roller of the conveyor belt system when the end of the exposed return roller of said conveyor belt system becomes disengaged and free-falling, even when the exposed return roller of the conveyor belt system is still spinning.

36. The guard bracket of claim 1, further comprising welds.

37. The guard bracket of claim 36, wherein said welds attach said guard bracket to the existing attachment point hardware of the exposed return roller of the conveyor belt system.

38. The guard bracket of claim 36, wherein said welds attach said trapezoidal-shaped plate of said first portion to the existing attachment point hardware of the exposed return roller of the conveyor belt system.

39. The guard bracket of claim 1, further comprising combination nuts and bolts.

40. The guard bracket of claim 39, wherein said combination nuts and bolts attach said guard bracket to the existing attachment point hardware of the exposed return roller of the conveyor belt system.

41. The guard bracket of claim 39, wherein said combination nuts and bolts attach said trapezoidal-shaped plate of said first portion to the existing attachment point hardware of the exposed return roller of the conveyor belt system.

42. The guard bracket of claim 1, wherein said first portion is a U-shaped, rod-like first portion.

43. The guard bracket of claim 1, wherein said second portion is a trapezoidal-shaped, rod-like second portion.

44. The guard bracket of claim 1, wherein said third portion is a U-shaped, rod-like third portion.

* * * * *